ized Stafes Patent Office
3,337,432
Patented Aug. 22, 1967

3,337,432
CARNALLITE TYPE COMPOSITION
Richard C. Belski, Bay City, Mich., assignor to The Dow Chemical Company, Midland, Mich., a corporation of Delaware
No Drawing. Filed June 24, 1964, Ser. No. 377,499
3 Claims. (Cl. 204—70)

This invention relates to a new carnallite type compound and more particularly, is concerned with a specific solid solution of the carnallite type containing magnesium chloride, potassium chloride, ammonium chloride and water.

Magnesium chloride has long been known for its use as an electrolyte in magnesium reduction cells in the manufacture of magnesium metal. Certain of these cells require the presence of fixed amounts of potassium chloride and magnesium chloride in the electrolyte. The composition of matter of the instant invention provides such a feed for a magnesium reduction cell.

In a system composed of $MgCl_2$, $KCl$, $NH_4Cl$ and $H_2O$, I have now unexpectedly discovered a novel complex compound which contains the minimum amount of magnesium chloride necessary for a precipitation of said complex. This discovery has utility in that dilute solutions of magnesium chloride can now be used in effecting a maximum recovery of the instant carnallite type compound, said compound containing a relatively small quantity of magnesium chloride.

Thus, it is an object of the instant invention to provide a composition of matter, namely, a solid solution comprised of magnesium chloride, potassium chloride, ammonium chloride and water which contains less magnesium chloride than like compositions heretofore known.

An additional object is to provide a composition which contains a predetermined amount of potassium chloride for use in magnesium reduction cells and the like.

Other objects and advantages of the instant invention will become apparent from reading the detailed description disclosed hereinafter.

The carnallite compound of the invention is a solid solution comprised of from about 32 to about 34 weight percent magnesium chloride, from about 4 to about 12 weight percent potassium chloride, from about 14 to about 19 weight percent ammonium chloride and from about 41 to about 44 weight percent water.

A method of preparing this novel compound is comprised of providing an aqueous solution of from about 26.7 to about 47.0 percent and preferably from about 26.7 to about 35.5 percent by weight $MgCl_2$, of from about 3.2 to about 0.01 percent and preferably from about 3.2 to about 0.14 percent by weight KCl, and adding solid ammonium chloride thereto so as to maintain a weight ratio of $MgCl_2$/$NH_4Cl$ within the range of from about 4.5 to about 67 whereupon the present novel magnesium chloride, potassium chloride, ammonium chloride and water solid solution precipitates directly as the mixture is agitated. The solid product is then separated from the remaining aqueous solution, e.g., by filtration.

Another method of preparing this compound comprises providing an aqueous solution of from about 21.1 to about 47 percent and preferably from about 21.1 to about 35.4 percent by weight $MgCl_2$, of from about 8.7 to about 0.01 percent and preferably from about 9.7 to about 0.09 percent by weight $NH_4Cl$ and adding solid potassium chloride thereto so as to maintain a weight ratio of $MgCl_2$/$KCl$ within the range from about 9.9 to about 23 whereupon the present novel magnesium chloride, potassium chloride, ammonium chloride and water solid solution precipitates directly as the mixture is agitated. The solid product is then separated from the remaining solution, e.g., by filtration.

Temperature has no major effect on the system of the instant invention except to merely increase the solubility of the present novel composition in the mother liquor. Temperature ranging from about 0° C. to about 118° C. can be used in making the instant composition.

The following examples further illustrate the invention, but are not intended to limit the invention thereto.

*Example I*

To about 700 grams of a solution having a composition as follows:

| | Percent (about) |
|---|---|
| $MgCl_2$ | 26.66 |
| KCl | 3.19 |
| $H_2O$ | 70.15 | about 71 grams of solid ammonium chloride were added so as to saturate said solution with respect to ammonium chloride. The mixture was continuously agitated in a constant water bath at about 25° C. for about 24 hours. A solid product formed which was separated from the remaining solution by filtration. This product analyzed to be a solid solution having the following compositions:

| | Percent (about) |
|---|---|
| $MgCl_2$ | 33.3 |
| KCl | 4.4 |
| $NH_4Cl$ | 18.7 |
| $H_2O$ | 43.6 |

*Example II*

To about 700 grams of a solution having a composition as follows:

| | Percent (about) |
|---|---|
| $MgCl_2$ | 21.1 |
| $NH_4Cl$ | 8.7 |
| $H_2O$ | 70.2 | about 27 grams of solid potassium chloride were added so as to saturate said solution with respect to potassium chloride. The mixture was continuously agitated in a constant water bath at about 25° C. for about 24 hours. A solid product formed which was separated from the remaining solution by filtration. This product analyzed to be a solid solution having a composition as follows:

| | Percent (about) |
|---|---|
| $MgCl_2$ | 32.2 |
| KCl | 11.6 |
| $NH_4Cl$ | 14.6 |
| $H_2O$ | 41.6 |

Various modifications can be made in the method of the present invention without departing from the spirit or scope thereof, for it is understood that we limit ourselves only as defined in the appended claims.

What is claimed is:

1. A carnallite-type composition comprised of from about 32 to about 34 percent by weight magnesium chloride, from about 4 to about 12 percent by weight potassium chloride, from about 14 to about 19 percent by weight ammonium chloride and from about 41 to about 44 percent by weight water.

2. A carnallite-type composition comprised of about 33.3 percent by weight magnesium chloride, about 4.4 percent by weight potassium chloride, about 18.7 percent by weight ammonium chloride and about 43.6 percent by weight water.

3. A carnallite-type composition comprised of about 32.2 percent by weight magnesium chloride, about 11.6 percent by weight potassium chloride, about 14.6 percent by weight ammonium chloride, and about 41.6 percent by weight water.

References Cited

UNITED STATES PATENTS

| | | | |
|---|---|---|---|
| 1,567,318 | 12/1925 | Cottringer et al. | 204—70 |
| 1,875,013 | 8/1932 | Kaselitz | 23—87 |
| 2,165,284 | 7/1939 | Madorsky | 204—70 |
| 2,888,389 | 5/1959 | Williams et al. | 204—70 |
| 3,181,930 | 5/1965 | Olsen | 23—91 |

JOHN H. MACK, *Primary Examiner.*

H. M. FLOURNOY, *Assistant Examiner.*